3,758,423
POLYMER AND PROCESS FOR PRODUCING SAME FROM AN EPOXY MONOMER AND A SILICON CONTAINING COREACTANT
Lynn J. Taylor, Haslett, Mich., assignor to Owens-Illinois, Inc.
No Drawing. Filed Aug. 16, 1971, Ser. No. 172,253
Int. Cl. C08g 30/10
U.S. Cl. 260—2 EC 7 Claims

ABSTRACT OF THE DISCLOSURE

There is disclosed the preparation of novel polymeric compounds by the reaction of at least one epoxy monomer and at least one silicon containing coreactant, each reactant having a functionality of at least two. The resulting material is highly suitable for adhesive, coating, and like purposes.

---

This invention relates to the novel preparation of novel polymers.

In the prior art, it has been known to react monofunctional epoxy monomers and halogenated silanes. For example, reference is made to German Pat. 840,763 wherein there is mentioned the reaction of a compound containing one epoxy group with silicon tetrachloride. Likewise, see Example V, page 6, of U.S. Letters Patent 3,072,594.

In accordance with the practice of this invention, there is reacted at least one opoxy monomer and at least one silicon containing coreactant, each reactant having a functionality of at least two, so as to produce a polymeric material highly suitable for adhesive, coating, and like purposes.

More particularly, there is reacted at least one epoxy monomer having an epoxide functionality of at least 2 and at least one silicon containing coreactant of the formula:

$$\begin{array}{c}R_1 \diagdown \diagup R_3 \\ Si \\ R_2 \diagup \diagdown R_4\end{array}$$

where at least two of the substituents ($R_1$, $R_2$, $R_3$, $R_4$) are selected from the same or different functional members of the group comprising: halogens (F, Cl, Br, I); hydroxyl (—OH); alkoxyl radicals (—OR) were R is a branched or linear alkyl containing one to sixteen carbons or cyclic aliphatic group containing at least three carbons; substituted or unsubstituted benzyloxy ($C_6H_5CH_2O$—)

substituted or unsubstituted benzoyloxy

acyloxy

where R is a branched or linear alkyl containing one to sixteen carbons or cyclic aliphatic group containing at least three carbons; substituted or unsubstituted phenoxy ($C_6H_5O$—); amino (—$NH_2$); alkylamino (—NHR) or dialkylamino (—NRR') where R or R' are the same or different branched or linear alkyl group(s) containing one to eight carbons or cyclic aliphatic group(s) containing at least three carbons; acylamino (—NHCOR) where R is a branched or linear alkyl containing one to ten carbons or cyclic aliphatic group containing at least three carbons; azide (—$N_3$); cyano (—CN); substituted or unsubstituted phenylamino (—$NHC_6H_5$); substituted or unsubstituted diphenylamino

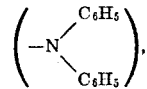

and sulfur-containing groups corresponding to the oxygen-containing groups cited hereinbefore; and the remaining non-functional substituents if any, are selected from the same or different non-functional members of the group comprising: hydrogen; linear or branched alkyl groups of one to eighteen carbon atoms; cyclic aliphatic groups of at least three carbons; substituted or unsubstituted phenyl; substituted or unsubstituted benzyl; allyl; methallyl; cinnamyl; or alpha or beta naphthyl.

It is also contemplated that the silicon atom may be incorporated into a cyclic structure such that two of the substitutents are members of the same ring, as in cyclotetramethylene dichlorosilane. Likewise, compounds containing 2 or more silicon atoms are contemplated.

In one preferred embodiment hereof, there is used a substituted dihalosilane.

As used in this invention, epoxy or epoxide monomers are characterized by having at least two reactive epoxide groups

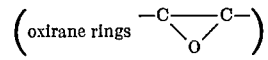

in the monomer structure and are commonly available in both liquid and solid form. As used herein the term "epoxy monomer" is to be considered inclusive of any epoxy monomer whether in the liquid or solid state.

In the practice of this invention, the epoxy monomer is free of any substituents such as hydroxyl groups which might tend to interfere with the overall polymerization.

Typical epoxy monomers contemplated herein include the so-called diepoxides such as: the diglycidyl ether of 2,2 - bis - (p - hydroxyphenyl) propane; the diglycidyl ether of ethylene glycol; the diglycidyl ether of 1,4-butanediol; 1,3 - pentadiene diepoxide; 1,7-octadiene diepoxide; butadiene diepoxide; dicyclopentadiene diepoxide; divinylbenzene diepoxide; vinylcyclohexene dioxide; isoprene diepoxide; the diglycidyl ether of polyethylene glycol; the diglycidyl ether of polypropylene glycol; bis-(2,3 - epoxycyclopentyl) ether; 3,4 - epoxycyclohexylmethyl - 3,4 - epoxycyclohexane carboxylate; bis(3,4-epoxy - 6 - methylcyclohexylmethyl) adipate; and limonene diepoxide.

Also the epoxy monomer may be a tri or polyfunctional epoxide such as the epoxy novolac resins and the tetraglycidyl ether of 1,1,2,2 - tetrakis(p - hydroxyphenyl) ethane.

Examples of the silicon containing co-reactant include dimethyldimethoxysilane; diphenyldimethoxysilane; phenylmethyldimethoxysilane; dimethyldiacetoxysilane; dimethyldibenzyloxysilane; diphenylsilanediol; dimethyl-bis-(dimethylamino) silane; phenyldimethoxysilane; phenyltrimethoxysilane; and methyltrimethoxysilane.

In one preferred practice, there is used a halosilane such as a dihalosilane, trihalosilane, or polyhalosilant. Typical examples are:

Dihalosilanes:
    Allylmethyldichlorosilane
    Allylphenyldichlorosilane
    Cyclopentamethylenedichlorosilane
    Cyclotetramethylenedichlorosilane
    Diallyldichlorosilane
    Dichloromethylmethyldichlorosilane
    Diethyldichlorosilane
    Dimethyldichlorosilane
    Dimethyldifluorosilane
    Diphenyldichlorosilane
    Diphenyldifluorosilane
    Methyldichlorosilane Methyloctadecyldichlorosilane
Methylvinyldichlorosilane
Phenyldichlorosilane
Phenylmethyldichlorosilane
Phenylvinyldichlorosilane
(3,3,3-trifluoropropyl)methyldichlorosilane Trihalosilanes:
Allyltrichlorosilane
Amyltrichlorosilane
Benzyltrichlorosilane
n-Butyltrichlorosilane
2-chloropropyltrichlorosilane
β-Chloroethyltrichlorosilane
p-Chlorophenyltrichlorosilane
Chloromethyltrichlorosilane
3-chloropropyltrichlorosilane
1,2-dichloroethyltrichlorosilane
Dichloromethyltrichlorosilane
Dichlorophenyltrichlorosilane (various isomers)
Dodecyltrichlorosilane
Ethyltrichlorosilane
Octadecyltrichlorosilane
β-Phenylethyltrichlorosilane
Phenyltrichlorosilane
n-Propyltrichlorosilane
p-Tolyltrichlorosilane
Trichlorosilane
3,3,3-trifluoropropyltrichlorosilane
Vinyltrichlorosilane
Vinyltrifluorosilane Polyfunctional halosilanes:
Hexachlorodisilane
Hexachlorodisiloxane
Silicon tetrachloride In the practice hereof, the two reactants may be used in equimolar or non-equimolar amounts. The latter is especially desirable in the preparation of pre-polymers.

As used herein equimolar is defined as the amount of reactant which is theoretically required to react with 100 percent of the other reactant, and vice versa, such that all of the functional groups on both reactants have been theoretically consumed in a completed reaction.

Although a wide range of temperature conditions are contemplated, it has been surprisingly discovered that in many cases the polymerization occurs rapidly at room temperature, e.g. about 50° F. to about 90° F.

As a consequence of this finding, it is highly convenient to prepare a mixture of the reactants, apply the mixture to a substrate, and then polymerize in situ. Typical substrates include glass, plastic, metal, wood, and paper.

The polymerization reaction may be carried out in the presence or absence of suitable solvents. Typical solvents include methylene chloride, ethylene dichloride, benzene, chlorobenzene, and diphenyl ether.

Likewise, the reaction may be carried out in the presence or absence of other selected ingredients including pigments, fillers, dyes, surfactants, curing agents, catalysts, stabilizing additives, reinforcing agents, etc.

In one highly preferred embodiment hereof, there is used a catalytic amount of an amine, especially a tertiary amine such as benzyldimethyl amine; N,N-dimethyl aniline; N,N-diethyl aniline; and 1,4-diazabicyclo-[2,2,2] octane.

The use of mixtures of two or more epoxy monomers, or of two or more silicon-containing co-reactants, is also contemplated. In particular the use of mixtures of difunctional and trifunctional silicon-containing co-reactants may be advantageous in that it will lead to the formation of high molecular weight branched and/or crosslinked polymeric products.

The following examples represent some of the best embodiments contemplated by the inventor in the practice of this invention.

EXAMPLE 1

A dry glass vial fitted with a drying tube and magnetic stirrer was charged with 1.82 grams (g.) dimethyldichlorosilane. The liquid silane was stirred continuously while an equivalent quantity (4.85 g.) of the solid diglycidyl ether of 2,2-bis(p-hydroxyphenyl) propane (D.E.R. 332LC, Dow Chemical Co.) was added, in small portions, over a 4-hr. period. The reaction mixture was allowed to stand overnight, then heated 1 hr. at 100° C.

A small layer of supernatant liquid was discarded. The remaining product was a rubbery polymer, which exhibited exceptional adhesion to glass. The product's infrared and nuclear magnetic resonance spectra suggested that the epoxide groups had been consumed. Vapor-pressure osmometry indicated that the product had a number-average molecular weight of 17,300.

EXAMPLE 2

A dry glass vial protected by a drying tube was charged with 7.05 g. vinylcyclohexene dioxide, 0.25 g. benzyldimethylamine, and 6.46 g. dimethyldichlorosilane. Shaking at room temperature initiated a vigorous exothermic reaction. After standing overnight, the reaction vessel contained a rubbery polymer, which was found to be soluble in methylene chloride. When a methylene chloride solution of this polymer was applied to a glass surface and allowed to evaporate, a clear strongly adherent coating formed; immersion in boiling water failed to destroy the clarity or adhesion of this coating.

EXAMPLE 3

A three-necked flask fitted with heating mantle and reflux condenser was flushed with nitrogen and charged with 14.1 g. vinylcyclohexene dioxide, 0.40 g. benzyldimethylamine, 20 ml. dry chlorobenzene, and 19.1 g. phenylmethyldichlorosilane. The resulting mixture was refluxed 4 hrs. in a nitrogen atmosphere; a marked increase in viscosity was observed during this period. Evaporation of the solvent yielded a clear, hard, brittle thermoplastic polymer, which exhibited strong adhesion to glass and to aluminum.

EXAMPLE 4

A dry glass beaker protected by a drying tube was charged with 10.0 g. vinylcyclohexene dioxide, 0.50 g. N,N-dimethylaniline, and 7.0 g. phenyltrichlorosilane. A spontaneous exothermic reaction ensued, leading to the formation of a clear, hard, slightly yellowish gel. When a portion of the warm, incompletely reacted mixture was removed and used to cement together two glass microscope slides, there was formed upon standing a strong, clear, rigid adhesive joint, which remained strong upon prolonged immersion in water.

EXAMPLE 5

A glass vial protected by a drying tube was charged with 5.0 g. vinylcyclohexene dioxide, 5.0 g. dry methylene chloride, 0.20 g. benzyldimethylamine, and 5.0 g. phenyltrichlorosilane. A portion of the resulting clear solution was used to cement together a pair of glass microscope slides. After standing overnight the resulting "sandwich" structure was heated 1 hr. at ca. 90° C. The resulting "cured" material formed a strong, clear adhesive joint; boiling in water failed to destroy its adhesion to glass.

The polymeric products prepared in accordance with this invention are useful as coating materials, adhesives, adhesion-promoting additives, surface-treatment reagents, prepolymers, curing agents, flame-retarding additives, and as encapsulation and potting media for the protection and packaging of electrical circuits and components.

I claim:
1. A process for preparing a polymeric composition which comprises
   (a) reacting at least one epoxy reactant and at least one silicon containing reactant,

(b) each reactant having a functionality of at least two, (c) said silicon-containing reactant having the formula:

where at least two of the substituents $R_1$, $R_2$, $R_3$, and $R_4$ consist of halogens and any remaining of the substituents are the same or different non-functional substituents of the group consisting of hydrogen, linear or branched alkyl groups of one to eighteen carbon atoms, cyclic aliphatic groups of at least three carbon atoms, substituted or unsubstituted phenyl, substituted or unsubstituted benzyl, allyl, methallyl, cinnamyl, and alpha or beta naphthyl, and (d) said epoxy reactant being free of any hydroxyl groups and having at least two reactive 1,2-epoxide groups.

2. The process of claim 1 wherein the epoxy reactant is a diepoxide selected from the diglycidyl ether of 2,2-bis(p-hydroxyphenyl) propane; the diglycidyl ether of ethylene glycol; the diglycidyl ether of 1,4-butanediol; 1,3-pentadiene diepoxide; 1,7-octadiene diepoxide; butadiene diepoxide; dicyclopentadiene diepoxide; divinylbenzene diepoxide; vinylcyclohexene dioxide; isoprene diepoxide; the diglycidyl ether of polyethylene glycol; the diglycidyl ether of polypropylene glycol; bis(2,3-epoxycyclopentyl) ether; 3,4-epoxycyclohexylmethyl-3,4-epoxycyclohexane carboxylate; bis(3,4-epoxy-6-methylcyclohexylmethyl) adipate; or limonene diepoxide.

3. The process of claim 1 wherein the silicon containing reactant is a dihalosilane selected from allylmethyldichlorosilane, allylphenyldichlorosilane, cyclopentamethylenedichlorosilane, cyclotetramethylenedichlorosilane, diethyldichlorosilane, dimethyldichlorosilane, dimethyldifluorosilane, diphenyldichlorosilane, diphenyldifluorosilane, methyldichlorosilane, methyloctadecyldichlorosilane, methylvinyldichlorosilane, phenyldichlorosilane, phenylmethyldichlorosilane, phenylvinyldichlorosilane, or (3,3,3-trifluoropropyl)methyldichlorosilane.

4. The process of claim 1 wherein the silicon containing reactant is a trihalosilane selected from allyltrichlorosilane, amyltrichlorosilane, benzyltrichlorosilane, n-butyltrichlorosilane, 2-chloropropyltrichlorosilane, β-chloroethyltrichlorosilane, p-chlorophenyltrichlorosilane, chloromethyltrichlorosilane, 3-chloropropyltrichlorosilane, 1,2-dichloroethyltrichlorosilane, dichloromethyltrichlorosilane, dichlorophenyltrichlorosilane (various isomers), dodecyltrichlorosilane, ethyltrichlorosilane, octadecyltrichlorosilane, β-phenylethyltrichlorosilane, phenyltrichlorosilane, n-propyltrichlorosilane, p-tolyltrichlorosilane, trichlorosilane, 3,3,3-trifluoropropyltrichlorosilane, vinyltrichlorosilane, or vinyltrifluorosilane.

5. The process of claim 1 wherein the reaction is at a temperature of about 50° F. to about 90° F.

6. The process of claim 1 wherein a mixture of the reactants is prepared, the mixture applied to a substrate, and the mixture then polymerized in situ on the substrate.

7. As a composition of matter, a polymeric product prepared by
(a) the reaction of at least one epoxy reactant and at least one silicon-containing reactant,
(b) each reactant having a functionality of at least two,
(c) said silicon-containing reactant having the formula:

where at least two of the substituents $R_1$, $R_2$, $R_3$, and $R_4$ consist of halogens and any remaining of the substituents are the same or different non-functional substituents of the group consisting of hydrogen, linear or branched alkyl groups of one to eighteen carbon atoms, cyclic aliphatic groups of at least three carbon atoms, substituted or unsubstituted phenyl, substituted or unsubstituted benzyl, allyl, methyllyl, cinnamyl, and alpha or beta naphthyl, and
(d) said epoxy reactant being free of any hydroxyl groups and having at least two reactive 1,2-epoxide groups.

References Cited
UNITED STATES PATENTS

| | | | |
|---|---|---|---|
| 3,287,160 | 11/1966 | Ender | 260—2 X |
| 2,381,137 | 8/1945 | Patnode et al. | 260—46.5 X |
| 3,150,116 | 9/1964 | Masters | 260—47 |
| 3,072,594 | 1/1963 | Shultz et al. | 260—47 |

OTHER REFERENCES

Handbook of Epoxy Resin, Lee et al. (1967), pp. 15-13 to 15-14).

HAROLD D. ANDERSON, Primary Examiner

T. E. PERTILLA, Assistant Examiner

U.S. Cl. X.R.

117—124 E, 127, 148, 138.8 R, 155 R; 260—2 S, 33.2 EP, 33.6 EP, 33.8 EP, 47 EC, 59, 78.4 EP